United States Patent
Pijlman et al.

(10) Patent No.: US 8,400,397 B2
(45) Date of Patent: Mar. 19, 2013

(54) BACKLIGHTING SYSTEM AND DISPLAY DEVICE

(75) Inventors: Fetze Pijlman, Eindhoven (NL); Michel Cornelis Josephus Marie Vissenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 311 days.

(21) Appl. No.: 12/742,698

(22) PCT Filed: Nov. 13, 2008

(86) PCT No.: PCT/IB2008/054753
§ 371 (c)(1),
(2), (4) Date: May 13, 2010

(87) PCT Pub. No.: WO2009/066205
PCT Pub. Date: May 28, 2009

(65) Prior Publication Data
US 2010/0265275 A1    Oct. 21, 2010

(30) Foreign Application Priority Data
Nov. 20, 2007   (EP) ..................... 07121097

(51) Int. Cl.
G09G 3/36   (2006.01)
G02F 1/1335   (2006.01)
G09F 13/04   (2006.01)
G09F 13/08   (2006.01)

(52) U.S. Cl. .............. 345/102; 349/61; 349/62; 349/66; 362/97.1; 362/97.2; 362/97.3

(58) Field of Classification Search ................... 345/102; 349/61–71; 362/97.1–97.3
See application file for complete search history.

(56) References Cited

U.S. PATENT DOCUMENTS

| 1,748,250 | A | 2/1930 | Spang |
| 7,052,152 | B2 | 5/2006 | Harbers et al. |
| 2005/0001537 | A1 | 1/2005 | West et al. |
| 2007/0024772 | A1* | 2/2007 | Childers et al. ................. 349/68 |

(Continued)

FOREIGN PATENT DOCUMENTS

| WO | 2006129232 A2 | 12/2006 |
| WO | 2006129246 A2 | 12/2006 |

*Primary Examiner* — Bipin Shalwala
*Assistant Examiner* — Ilana Spar
(74) *Attorney, Agent, or Firm* — Mark Beloborodov (57) ABSTRACT

The invention relates to a backlighting system (10, 11, 12, 13, 14, 15, 16) and to a display device. The backlighting system comprises a plurality of segments (20, 21, 22, 23, 24) for selectively illuminating a predefined area of pixels of a display device. The backlighting system is configured for selectively controlling the intensity and/or color of the light emitted from the segment, each segment comprising a light source (30). The backlighting system (10, 11, 12, 13, 14, 15, 16) further comprises light barriers (40) for limiting the lateral-spreading of the light emitted by the light source (30) towards the neighboring segments (20, 21, 22, 23, 24). The light barriers define grid-lines of a grid, and the light source (30) is arranged at a position on the grid-line which at least partially coincides with at least one of the light barriers. The effect of the measures according to the invention is that by positioning the light source of the segment on the same grid-line as the light barriers, the light from the light source spreads on either side of the light barrier towards the neighboring segments. This enables a predefined overlap of the light emitted by the segment towards its neighboring segments without the need for additional thickness of the backlighting system.

16 Claims, 8 Drawing Sheets

U.S. PATENT DOCUMENTS

| | | |
|---|---|---|
| 2007/0109779 A1 | 5/2007 | Sekiguchi et al. |
| 2007/0152135 A1* | 7/2007 | Watanabe et al. .......... 250/208.1 |
| 2007/0159849 A1 | 7/2007 | Sakai |
| 2007/0236628 A1* | 10/2007 | Epstein ........................... 349/67 |
| 2009/0086508 A1* | 4/2009 | Bierhuizen ................... 362/617 |
| 2009/0102757 A1* | 4/2009 | Chiou et al. .................... 345/76 |

* cited by examiner

BACKLIGHTING SYSTEM AND DISPLAY DEVICE

FIELD OF THE INVENTION

The invention relates to a backlighting system comprising a plurality of segments for selectively illuminating a predefined area of pixels.

The invention also relates to a one- or two-dimensional dimmable light source or to a display device.

BACKGROUND OF THE INVENTION

Backlight systems which comprise a plurality of segments for selectively illuminating a predefined area of pixels are known per se, and are also known in the art as two-dimensional dimmable backlighting systems. They are used, inter alia, as light sources in (picture) display devices, for example, for TV sets and monitors. Such illumination systems are particularly suitable for use as backlighting systems for non-emissive display devices such as liquid crystal display devices, also denoted LCD panels, which are used in, for example, (portable) computers or, for example, (portable) telephones.

Said non-emissive display devices usually comprise a substrate provided with a regular pattern of pixels which are each controlled by at least one electrode. The display device utilizes a control circuit for achieving a picture or a data graphical display in a relevant field of a (picture) screen of the (picture) display device. The light originating from the backlighting system in an LCD device is modulated by means of a switch or modulator in which, for example, various types of liquid crystal effects may be used. In addition, the display may be based on electrophoretic or electromechanical effects.

Such a backlighting system for illuminating an image display device is known from US patent application US 2007/0024772, which discloses a matrix of liquid crystal elements and a plurality of direct backlight devices. Each direct backlight device is configured to selectively illuminate a discrete portion of the matrix of the liquid crystal elements associated with a backlighting sub-region with a temporal sequence of at least two illumination color lights during an image frame period. The known backlight device comprises sub-region barriers which separate one sub-region from another preventing light from one sub-region from leaking into an adjacent sub-region.

A drawback of this known backlighting device is that additional measures for creating overlap between segments are added, which increase the thickness of the known backlighting system.

SUMMARY OF THE INVENTION

It is an object of the invention to provide a backlighting system having a predefined overlap without the need for additional thickness.

According to a first aspect of the invention, the object is achieved with a backlighting system comprising a plurality of segments for selectively illuminating a predefined area of pixels of a display device, the backlighting system being configured for selectively controlling the intensity and/or color of the light emitted from the segment, each segment comprising a light source, the backlighting system further comprising light barriers for limiting the lateral spreading of the light emitted by the light source towards the neighboring segments, the light barriers defining grid-lines of a grid, the light source occupying a position on the grid-line which at least partially coincides with at least one of the light barriers.

The thickness of the backlighting system is a dimension measured substantially perpendicularly to the grid comprising the light barriers and light sources.

The effect of the measures according to the invention is that by positioning the light source of the segment on the same grid-line as the light barriers, the light from the light source spreads on either side of the light barrier towards the neighboring segments. This generates a predefined overlap of the light emitted by the segment towards its neighboring segments. This predefined overlap is required to prevent artifacts such as halos in still or moving images or, for example, variations in the viewing angle of the display device. When, for example, the light barriers form a lattice which is substantially identical to the lattice of segments but which is shifted such that the light source is, for example, arranged substantially in the center of the segment, the light spreading away from the light barrier will spread to the neighboring segments. The next light barrier which the spreading light encounters is arranged at the center of the neighboring segment, where the light, for example, is at least partially blocked from further spreading through the backlighting system. This generates the predefined overlap of the light from the light source associated with a segment towards neighboring segments, while limiting the extent of the overlap. Furthermore, the generation of this predefined overlap is caused by the arrangement of the light source with respect to the light barriers and thus no additional thickness of the backlighting system according to the invention is required to generate this predefined overlap. Due to limitation of the extent of the overlap, local dimming or boosting of the light output of segments in the backlighting system still provides an improvement of the contrast.

The light barriers form a lattice. The edges of the segments do not coincide with the grid-lines of the grid of the light barriers. When, for example, each segment comprises a single light source which, for example, is arranged in the center of the segment, the light barriers at least partially coincide with grid-lines which intersect with the light source. These light barriers will at least partially cross each segment and are arranged to do so substantially at the center of the segment. Due to this arrangement of the light barriers, the light emitted by the light source will spread relatively easily within the segment in which the light source is located and to the directly neighboring segments. Light barriers in the directly neighboring segments may, for example, prevent the light from spreading further towards further segments, thus limiting the lateral spreading of the light emitted by the light source substantially to its direct neighbors. As a result, the arrangement of the light barriers according to the invention causes the light emitted by the light source to be distributed such that it overlaps the directly neighboring segments and is limited so as to overlap no further segments apart from the directly neighboring segments. As a consequence, this arrangement provides the predefined overlap between segments without the need for additional height, which would increase the thickness of the backlighting system.

In the known arrangement of light barriers, the light barriers substantially coincide with the edges of the segments, and the light source per segment is positioned substantially in the center of the segment. In this known arrangement as shown in the cited patent application, the additional diffusion layer is used to cause the light emitted in one segment to partially overlap further segments. Alternatively, the light barriers in the known arrangement may not fully shield the light emitted by the light source, thus allowing it to partially overlap other segments. This may, for example, be achieved by adding "free space" above the light barriers, for example by having an air gap between the light barrier and further optical layers leading towards the liquid crystal cells. This additional air gap creates additional height and must be carefully tuned to prevent distribution of the light over a large number of segments. When the distribution is across a large number of segments, it is substantially impossible to locally alter the intensity of the light emitted from the segment to obtain contrast enhancement, because the light emitted by a single segment comprises a relatively large contribution of light from all surrounding segments, which significantly limits the range within which a single segment may be dimmed or boosted. In the backlighting system according to the invention, the light barriers are positioned to coincide with grid-lines of the grid on which also the light sources of the individual segments are located. This configuration is against any intuitive arrangement of the light barriers and enables the surprising effect that the light distribution resulting from the light source together with the light barriers illuminates the associated segment together with its direct neighboring segments. As a result, the extent to which the light from the light source is distributed is limited, generating a predetermined overlap which prevents image artifacts without increasing the height of the backlighting system according to the invention. Furthermore, this arrangement of light sources and light barriers generates a sufficiently local illumination of the segment to enable a relatively large contrast difference to be used for locally dimming the backlighting system.

In an embodiment of the backlighting system, the light source is arranged on an intersection between two grid-lines, each of the two grid lines at least partially coinciding with at least one of the light barriers. A benefit of this embodiment is that the spreading of the light from the light source is in two dimensions, providing an overlap of the neighboring segments in two dimensions. This overlap in two dimensions improves the uniformity of the backlighting system in two dimensions and thus enables the backlighting system according to the invention to be used as a two-dimensional dimming backlighting system.

In an embodiment of the backlighting system, the grid comprises a substantially orthogonal grid. A benefit of this embodiment is that this orthogonal grid more closely resembles the shape of the screen, making it relatively easy to match the arrangement of segments evenly to the shape of the screen. Furthermore, the use of a substantially orthogonal grid requires only four light barriers to be present near the light source. Generally, every light barrier may influence the uniformity. Thus, by reducing the number of light barriers, the uniformity of the light emitted by the backlighting system may be improved.

In an embodiment of the backlighting system, neighboring intersections of the light source are free from further light sources, the neighboring intersections being intersections constituted of light barriers at least partially coinciding with the grid-lines on either side of the light source when moving along the grid-lines. When moving along a grid-line, only every second intersection of grid-lines at least partially coinciding with light barriers comprises a light source. In this arrangement a distance between all light sources of which the emitted light overlaps is substantially equal, being a diagonal distance between grid-points. This arrangement of the light sources enables a further improvement of the uniformity of the light emitted by the backlighting system across the backlighting system. When, for example, the light barriers are arranged in a square or rectangular lattice, only two corners arranged diagonally towards each other of the four corners comprise a light source. Thus, the distance between all light sources and their neighbors is substantially equal to the diagonal dimension of the square or rectangular lattice. Although the distance between two light sources along the grid-lines is different than the diagonal distance between grid-points, the light of these two light sources substantially does not overlap. The intersection of light barriers in-between the two light sources, which intermediate space does not contain a light source, substantially prevents the light from the two light sources from generating an overlap, and thus the light sources arranged along the grid-lines only marginally influence each other.

In contrast, when every corner of the square or rectangular lattice of light barriers would comprise a light source, the distance between two neighboring light sources would be either the distance between two corners along the grid-lines or the distance between two corners as measured along the diagonal of the square or rectangular lattice. In such an arrangement, the distance between two light sources would not be constant, which makes it more difficult to generate a uniform distribution of the light emitted by the backlighting system across the backlighting system. Choosing only two diagonally opposite corners of the square or rectangular lattice to provide a light source, makes the distance between two light sources substantially constant, thus improving the uniformity of the light emitted across the backlighting system.

In an embodiment of the backlighting system, the light barriers at least partially coinciding with the grid-lines are arranged in a triangular arrangement. A benefit of this embodiment is that this arrangement more closely resembles circular segments, which are perceived by a viewer as more uniform. Furthermore, this triangular arrangement provides overlap between six neighboring segments. By increasing the number of segments with which the overlap is generated, a further improvement of the uniformity of the light emitted by the backlighting system is generated.

In an embodiment of the backlighting system, the triangular arrangement comprises isosceles triangles. A benefit of this embodiment is that also in this arrangement of the light sources and the light barriers, all light sources are arranged at substantially the same distance, which again enables an improvement of the uniformity of the light emitted by the backlighting system across the backlighting system.

In an embodiment of the backlighting system, the backlighting system comprises a light guide comprising the light barriers and the light sources. A benefit of this embodiment is that the light is efficiently guided within the light guide, for example, via total internal reflection. Extraction of the light may be done via known extraction means, such as microdots, scratches, etc.

In an embodiment of the backlighting system, the light barriers are slits cut into the light guide. A benefit of this embodiment is that these light barriers are relatively easy to manufacture. When the light guide is produced of, for example, Polymethyl-methacrylate (also known as PMMA), the slits may be generated relatively simply and accurately using laser cutters.

In an embodiment of the backlighting system, the slits are at least partially filled with a reflective material. This reflective material may be used to control the reflectivity of the light barriers. The reflectivity may be influenced by making the light barriers partially translucent, or the type of reflection from the light barriers may be controlled so as to be, for example, diffuse or specular. A diffusely reflective light barrier is generally easier to produce and may contribute to a uniform emission of light from the backlighting system. Specularly reflective light barriers may, for example, be required when the emission of the light from the light source is predominantly in lateral direction. In such an embodiment, the reflection from the light barriers is required to mix the light in lateral direction.

In an embodiment of the backlighting system, the light guide comprises a plurality of sub-light guides, the edges of the plurality of sub-light guides being the light barriers. A benefit of this embodiment is that the sub-lightguides are typically smaller than a single slab of PMMA, resulting in a reduction of the cost of the backlighting system.

In an embodiment of the backlighting system, the edges of the sub-light guides comprise a reflective material. Again this reflective material may be used to influence the reflectivity by making the light barriers partially translucent, or to control the type of reflection from the light barriers. The use of sub-light guides makes the application of the reflective material relatively easy, as this material can be applied before the sub-light guides are assembled in the backlighting system according to the invention.

In an embodiment of the backlighting system, the sub-light guides are arranged for substantially directly illuminating a light emitting window of the backlighting system. The light emitting window may comprise a diffuser layer. A benefit of this embodiment is that it prevents brightness differences from occurring between different segments.

In an embodiment of the backlighting system, the light barriers are partially translucent.

In an embodiment of the backlighting system, the part of the grid-lines not covered by the light barrier is occupied by the positions of the light sources. The light barriers form a lattice for limiting the spreading of the light. The lattice is substantially fully closed and the only openings in the lattice are used to place the light sources. In such an embodiment, the lateral spreading of the light, for example, only towards the directly neighboring segments, or towards more than the directly neighboring segments, can be well controlled by the light barriers.

In an embodiment of the backlighting system, the light source in each segment is substantially arranged in the center of the segment. A benefit of this embodiment is that it enables a substantially uniform illumination of the group of pixels by the segment.

In an embodiment of the backlighting system, the light source emits substantially white light, and/or the light source comprises a plurality of light emitters emitting light of one or more predefined colors.

The light source may, for example, comprise a light emitting diode or a laser diode which emits at least a part of the emitted light in a lateral direction. Alternatively, the light source may be any other suitable light source which emits light at least partially in a direction parallel to the back plate of the backlighting system. The light source may emit substantially white light or may comprise, for example, a plurality of light emitting diodes which each emit light of a predefined color. The light source may also comprise a luminescent material for converting at least part of the emitted light into light of a different color. The light source may, for example, be a blue light emitting diode having a luminescent layer which converts part of the blue light into yellow light which, when mixed with the remaining blue light, generates substantially white light. The luminescent layer may also be located remote from the light emitter, generating a so called 'remote phosphor' arrangement. The light source may be relatively small compared to the dimensions of the segments, or may extend over a significant part of the segments.

In this context, light of a predefined color typically comprises light having a predefined spectrum. The predefined spectrum may, for example, comprise a primary color having a specific bandwidth around a predefined wavelength, or may, for example, comprise a plurality of primary colors. The predefined wavelength is a mean wavelength of a radiant power spectral distribution. In this context, light of a predefined color also includes non-visible light, such as ultraviolet light. When ultraviolet light is emitted by the light source, typically a light conversion medium is used, such as a luminescent material. The luminescent material, for example, converts the ultraviolet light into visible light. The conversion medium may be directly applied on the light source or may be applied remote from the light source. The light of a primary color, for example, includes Red, Green, Blue, Yellow, Amber, and Magenta light. Light of the predefined color may also comprise mixtures of primary colors, such as Blue and Amber, or Blue, Yellow and Red. By choosing, for example, a specific combination of the Red, Green and Blue light substantially every color can be generated by the illumination system, including white. Also other combinations of primary colors may be used in the light projection system, which enables the generation of substantially every color, for example, Red, Green, Blue, Cyan and Yellow. The number of primary colors used in the color-tunable illumination system may vary.

In an embodiment of the backlighting system, the light sources of the backlighting system are arranged on a substantially flat back plate of the backlighting system. A benefit of this embodiment is that the arrangement of substantially all light sources on a single flat plane enables a relatively flat backlighting system.

In an embodiment of the backlighting system, the backlighting system comprises a controller for receiving feedback information of the light sources for controlling the intensity and/or color of the light emitted by each segment. The feedback information may be information which is sensed only a single time at the factory or during an additional calibration run of the backlighting system and which is subsequently used as a correction value during the lifetime of the individual light sources to ensure that the light emitted by the individual light sources corresponds in intensity and/or color to the light emitted by the other light sources or to the required intensity and/or color. Alternatively, the feedback information may be continuous feedback information, allowing continuous monitoring of the intensity and/or color of the light emitted by the light sources to ensure that the correct intensity and/or color is generated by the light sources. Further alternatively, the feedback information may, for example, be an electrical signal, for example, an internal resistance signal related to aging of the light source. Sensing this electrical signal enables the backlighting system to correct for aging effects and thus ensure that the correct intensity and/or color is emitted from the light source.

The invention also relates to a one- or two-dimensional, dimmable light source as claimed in claim 19 and to a display device as claimed in claim 20.

BRIEF DESCRIPTION OF THE DRAWINGS

These and other aspects of the invention are apparent from and will be elucidated with reference to the embodiments described hereinafter.

In the drawings.

The figures are purely diagrammatic and not drawn to scale. Particularly for clarity, some dimensions are exaggerated strongly. Similar components in the figures are denoted by the same reference numerals as much as possible.

DETAILED DESCRIPTION OF EMBODIMENTS

Figure 1:
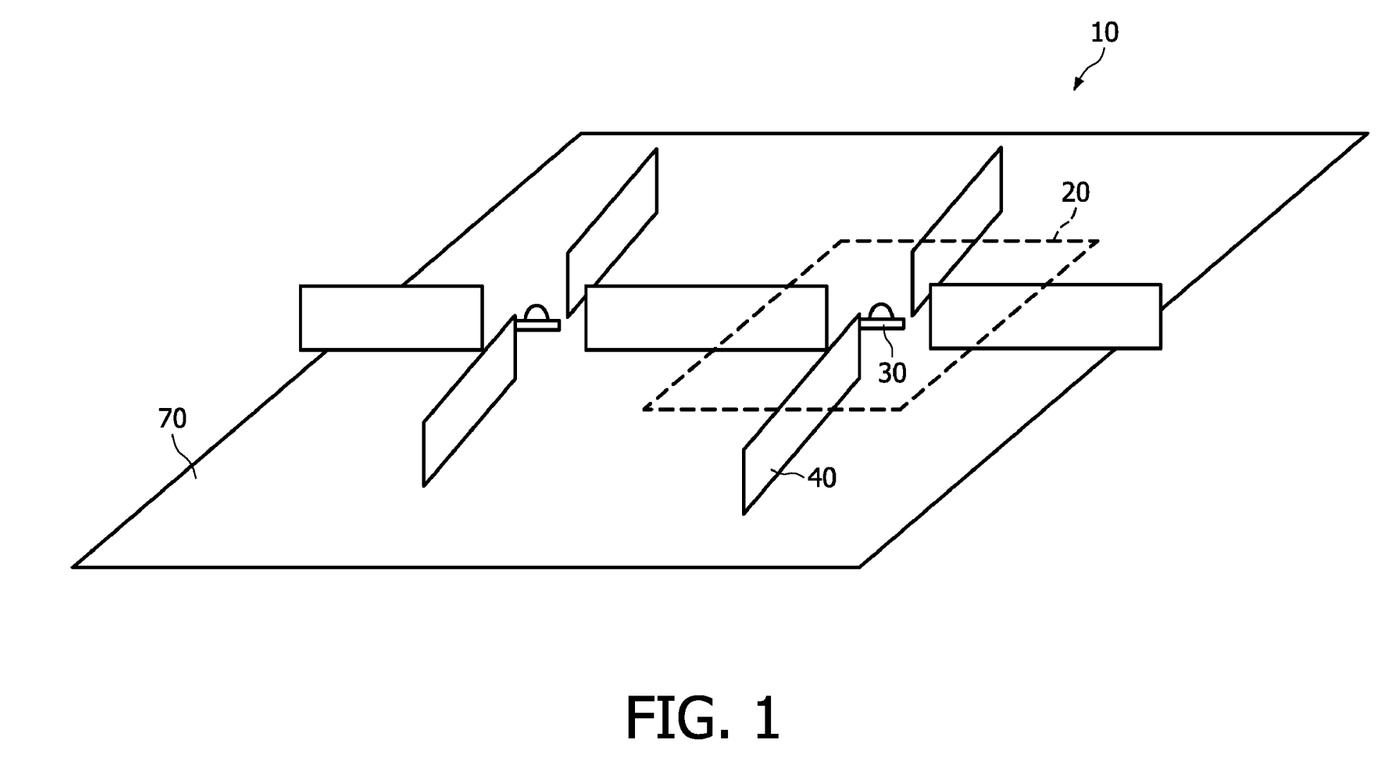
FIG. 1 shows a simplified three-dimensional view of an embodiment of the backlighting system according to the invention, FIGS. 2A, 2B, 2C, 2D, 2E, 2F and 2G each show a top view of the arrangement of light sources and light barriers in a backlighting system according to the invention.

FIG. 1 shows a simplified three-dimensional view of an embodiment of the backlighting system 10 according to the invention. In the simplified three-dimensional view of the backlighting system 10 an arrangement of light barriers 40 in an embodiment of walls 40 is arranged on a back plate 70 of the backlighting system 10. The light barriers 40 as shown in FIG. 1 are arranged in a regular substantially square grid. At the intersection points of the grid, which is defined by the light barriers 40, the light sources 30 are located. As can clearly be seen from the simplified three-dimensional view, the light emitted by the light sources 30 spreads in all directions as indicated with the arrows (see FIG. 2A). The backlighting system 10 comprises segments 20 (indicated with dashed lines), which selectively illuminate a predefined area of pixels (see FIG. 3). The light source 30 of each segment 20 may, for example, be positioned in the center of the segment 20 for illuminating the segment 20 associated with the light source 30 substantially evenly. As the light sources 30 are arranged on the same grid as defined by the light barriers 40, the light emitted by the light source 30 spreads beyond the associated segment 20 to neighboring segments. The spreading light of one of the light sources 30 will encounter, beyond the associated segment 20, a light barrier 40 at the grid-line which intersects with a next light source 30 arranged at the center of a neighboring segment 20. The light barriers 40 may be arranged to fully block the light from spreading further than the neighboring segments 20, or may be arranged to partially spread further than the adjacent segments 20. This partial spreading of the light beyond the light barriers 40 may be achieved by light barriers 40 which are partially translucent, or by light barriers 40 which have an opening to a further segment 40. This generates controlled spreading of the light emitted by the light source 30 without the need for additional height in the backlighting system 10 according to the invention, thus preventing an increase of the thickness of the backlighting system 10 for producing the predefined overlap. The thickness or height of the backlighting system 10 is a dimension measured substantially perpendicularly to the grid comprising the light barriers 40, or comprises a dimension measured in a direction substantially perpendicular to the back plate 70. The effect of this limitation of the lateral spreading of the light emitted by the light source 30 is that the overlap between light emitted by the light source 30 of one segment 20 to the adjacent segments 20 causes the uniformity of the light emitted across the backlighting system 10 to improve, while by virtue of the selective illumination of the segments the ability to generate large contrast differences across the display device 100 is maintained (see FIG. 3).

In the known backlighting system, the light barriers substantially coincide with the barriers of the segments of the backlighting system. If the light barriers in the known backlighting system fully block the light from spreading laterally towards the neighboring segments, the uniformity of the image produced on the display device is relatively poor. Alternatively, when the light barriers allow overlap of the light emitted by one segment towards the other segments of the display device, the overlap will substantially average out across the whole backlighting system, thereby reducing the ability of the backlighting system to selectively illuminate a predefined area of pixels to cause large contrast differences.

In the backlighting system 10 as shown in FIG. 1, the light barrier 40 is arranged as a substantially continuous wall in which openings are present where the light sources 30 are located. This arrangement causes the light from the light source 30 to be emitted on both sides of the light barrier 40, thereby always causing an overlap of the light emitted in one segments towards the adjacent segments. In the embodiment shown in FIG. 1, the light source 30 is arranged on an intersection point of two substantially perpendicularly arranged light barriers 40, which causes the light emitted by the light source 30 to spread in two dimensions. Alternatively, the light barrier 40 may have an opening in between two intersection points of light barriers 40 (see FIGS. 2D and 2E), which causes the light emitted by the light source 30 to only spread in one dimension. So the arrangement of the light source 30 together with the light barriers 40 generates lateral spreading of the light, the extent of which may be limited relatively simply to the next light barrier 40 encountered by the spreading light. The limited lateral spread improves the uniformity and enables large differences in illumination of the predefined area of pixels across the display device 100. Many arrangements of light barriers 40, 42, 44 and light sources 30 may be generated, some of which are shown in the embodiments shown in FIG. 2.

The backlighting system 10 as shown in FIG. 1 only shows the back plate 70, which generally comprises reflective material, the light sources 30 and an arrangement of light barriers 40. A backlighting system 10 may further comprise optical foils, diffusers and other optical layers (not shown) arranged on top of the light barriers 40 to further improve, for example, the uniformity of the light emitted by the backlighting system 10, or to further improve the directionality of the light emitted by the backlighting system 10. Furthermore, the backlighting system may be constituted of a light guide (see FIGS. 2F and 2G) in which, for example, the light barriers 42 (see FIGS. 2F and 2G) are slits 42 which are cut into the light guide and which may be filled with reflective or partially reflective material.

The light source 30 preferably comprises a light emitting diode 30 or a laser diode 30 which emits light in a lateral direction. Alternatively, the light source 30 may be any other suitable light source which emits light at least partially in a direction parallel to the back plate 70 of the backlighting system 10. The light source 30 may emit substantially white light or may comprise, for example, a plurality of light emitting diodes which each emit light of a predefined color.

FIGS. 2A, 2B, 2C, 2D, 2E, 2F and 2G each show a top view of the arrangement of light sources 30 and light barriers 40, 42, 44 in a backlighting system 10, 11, 12, 13, 14, 15, 16 according to the invention. In each of the following top views of the backlighting systems 10, 11, 12, 13, 14, 15, 16, the segments 20, 21, 22, 23, 24 are shown by dashed lines and the light barriers 40 are indicated with relatively thick lines. As can clearly be seen, the shape of the segments 20, 21, 22, 23, 24 is substantially identical to that of the grid which is formed by the light barriers 40, only shifted by half a segment 20, 21, 22, 23, 24. As a consequence, the light sources 30 are all arranged substantially in the center of the associated segment 20, 21, 22, 23, 24, which may generate a relatively good uniformity of the light emitted by the light source 30 across the associated segment 20, 21, 22, 23, 24. Other arrangements of the light source 30 or multiple light sources 30 per segment 20, 21, 22, 23, 24 are possible. At least one of the multiple light sources 30 is arranged in openings in the light barrier 40 to generate the controlled overlap between adjacent segments 20, 21, 22, 23, 24. The openings in the light barrier 40 preferably are substantially of the same size as the light sources 30 to prevent uncontrolled leakage of light emitted by the light source 30 in a direction away from the neighboring segments 20, 21, 22, 23, 24. However, typically a relatively small gap remains between the light barrier 40 and the light source 30 due to production tolerances.

Figure 2A:
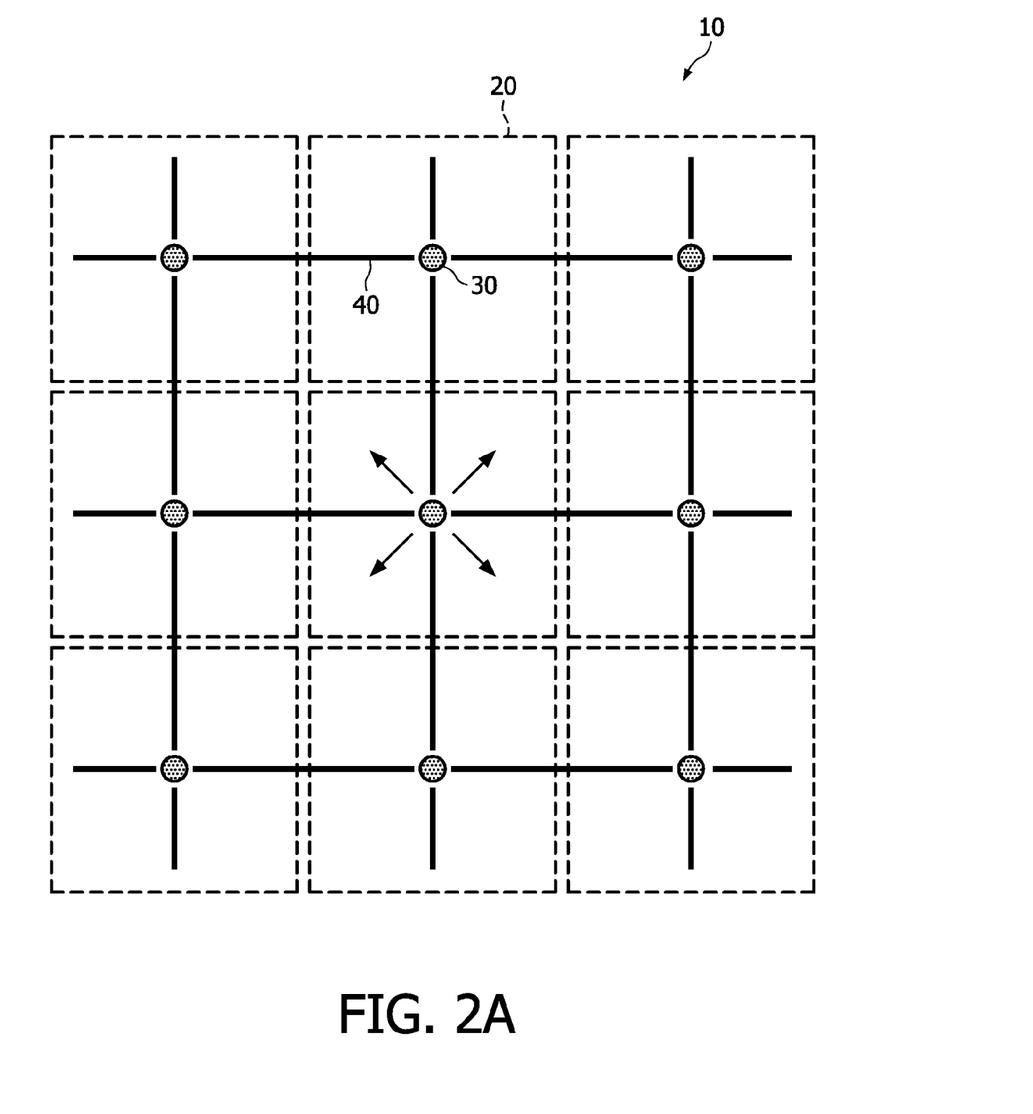

FIG. 2A shows a top view of a first embodiment of the backlighting system 10 according to the invention. This first embodiment comprises an arrangement of light sources 30 and light barriers 40, in which every intersection in the lattice of light barriers 40 comprises a light source 30 which emits light towards the eight adjacent segments 20 arranged around the center segment 20. A benefit of this arrangement is that the distance between two light sources 30 is relatively small, causing the height of the backlighting system 10 to be relatively small while having a relatively good uniformity across the backlighting system 10.

Figure 2B:
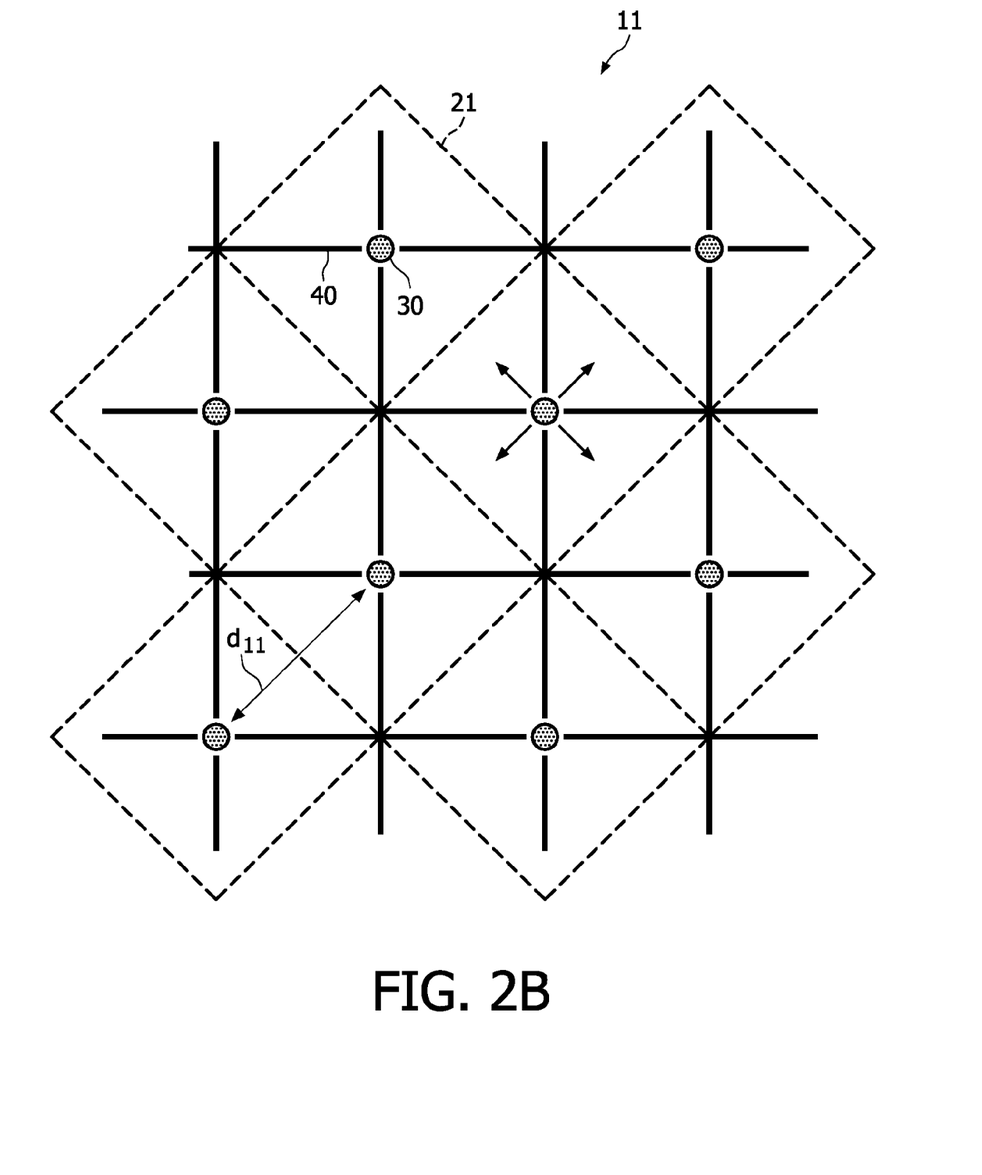

FIG. 2B shows a top view of a second embodiment of the backlighting system 11 according to the invention. This second embodiment comprises an arrangement of light sources 30 and light barriers 40, in which not every intersection in the lattice of light barriers 40 comprises a light source 30. In the current embodiment, the intersections in the lattice of light barriers 40, which are located next to a light source 30, do not contain a light source 30. So, when moving along the light barriers 40, every second intersection of light barriers 40 contains a light source 30. The light emitted by a light source 30 in the associated segment 21 is laterally spread and overlaps the four adjacent segments 21. A benefit of this arrangement is that the distance between the light sources 30, of which the light is mixed in a segment 21, are substantially equal, being a diagonal distance $d_{11}$ as indicated in FIG. 2B.

Figure 2C:
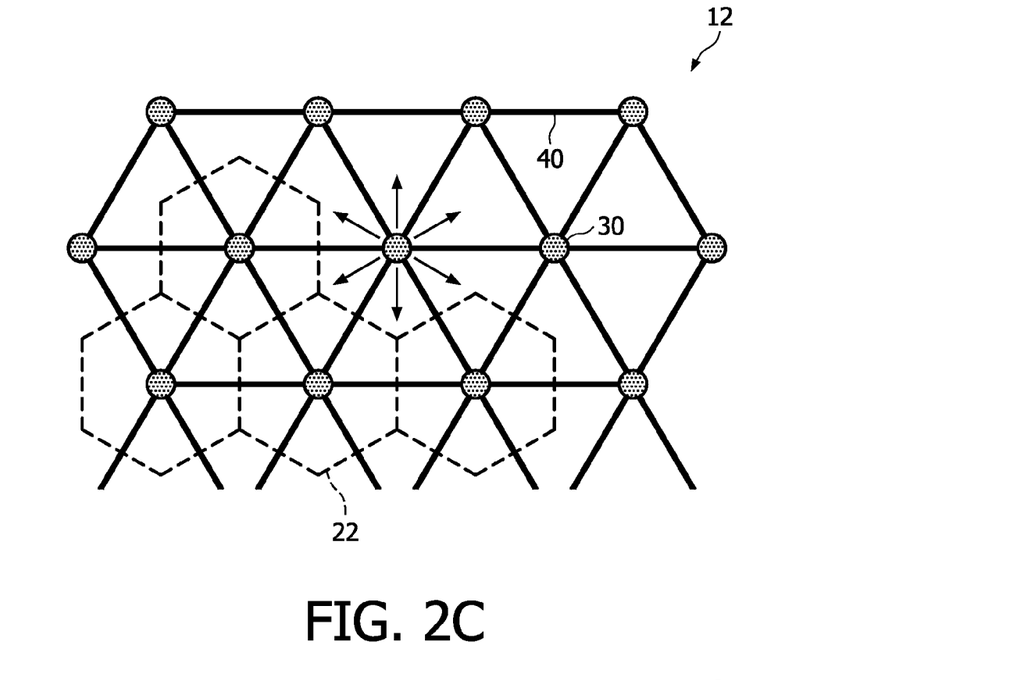

FIG. 2C shows a top view of a third embodiment of the backlighting system 12 according to the invention. This third embodiment comprises an arrangement of light sources 30 and light barriers 40, in which the lattice of light barriers 40 comprises a triangular lattice. The light sources 30 are again located at the intersection points of the triangular lattice. In the schematic top view as shown in FIG. 2C, the light sources 30 touch the light barriers 40, leaving substantially no room for uncontrolled leakage of light beyond the directly neighboring segments 22. However, in a practical embodiment of the backlighting system 12, there always will be a remaining gap between the light source 30 and the light barrier 40 due to production tolerances when producing the backlighting system 12. If the triangular lattice is constituted of isosceles triangles, the distance between two light sources 30, of which the light is mixed inside a segment 22, is substantially identical. The light source 30 emitting light in its associated segment 22 also emits light to the adjacent six segments, again generating a controlled lateral spreading of the emitted light from a light source 30. A benefit of this embodiment of the backlighting system 12 is that this arrangement more closely resembles circular segments which are perceived by a viewer as more uniform.

Alternatively, the segment 22 may not be triangular in shape but hexagonal. In such an embodiment, the number of light sources 30 illuminating a single hexangularly shaped segment may, for example, be seven.

Figure 2D:
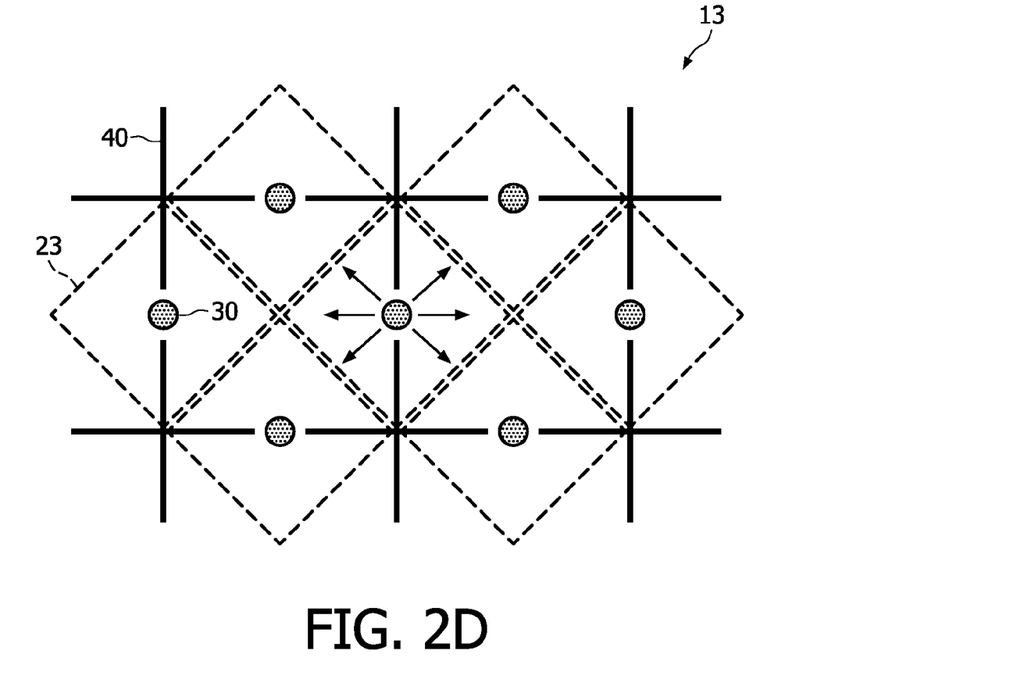
Figure 2E:
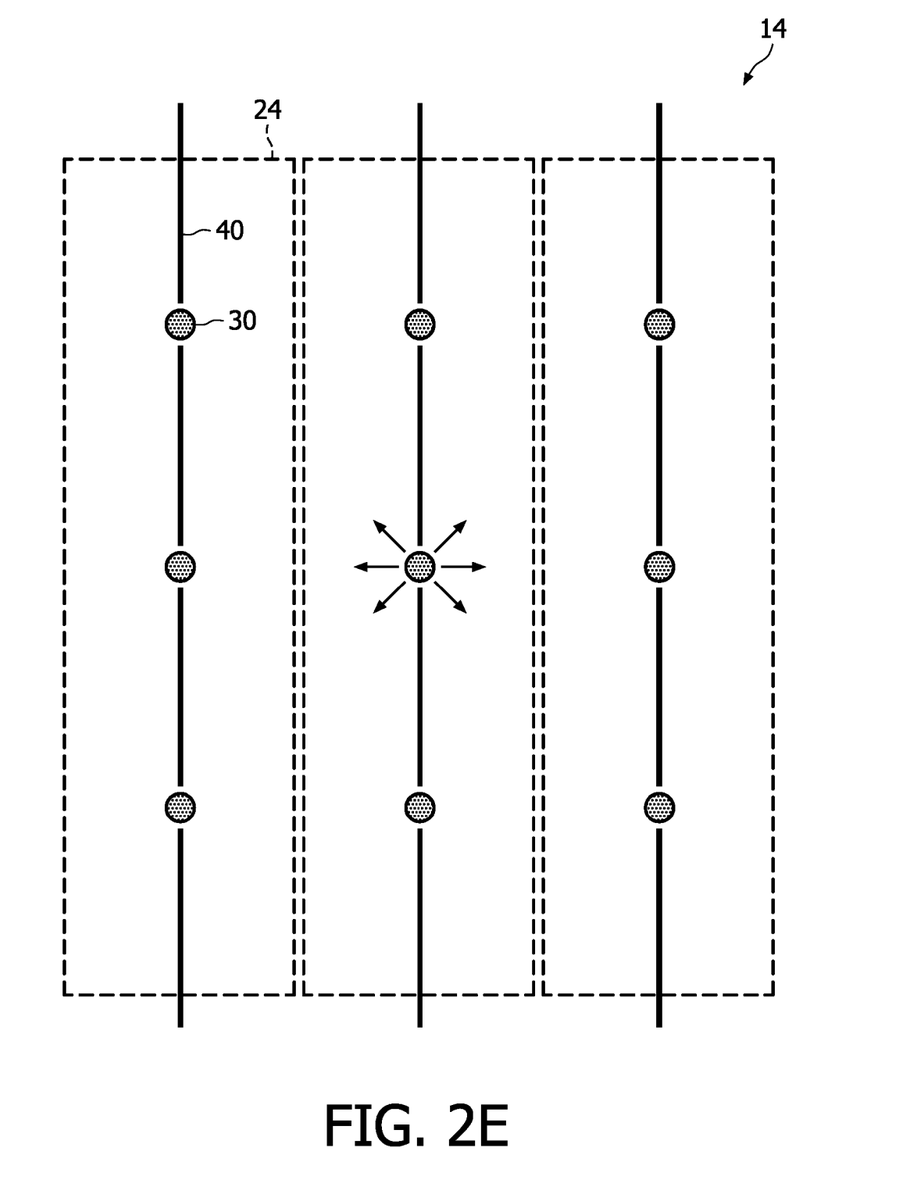

FIG. 2D shows a top view of a fourth embodiment of the backlighting system 13 according to the invention. This fourth embodiment comprises an arrangement of light sources 30 and light barriers 40, in which the light sources 30 are arranged in an opening in the light barrier 40 in between two intersections between light barriers 40. The light emitted by every light source 30 spreads on either side of the light barrier 40 and causes a two-dimensional lateral spreading of the light emitted by a light source 30. The segment 23 is a diamond shaped segment 23. FIG. 2E shows a top view of a fifth embodiment of the backlighting system 14 according to the invention. This fifth embodiment comprises an arrangement of light sources 30 and light barriers 40 in which the segments 24 are arranged in strips which, for example, may be sequentially illuminated. The light sources 30 again are arranged in openings in the light barriers 40 and provide an overlap in a direction perpendicular to the light barriers 40. In the embodiment shown in FIG. 2E the light barriers 40 are arranged in a vertical direction. Alternatively, the light barriers 40 may, of course, also be arranged in a horizontal direction, allowing a plurality of lines of pixels to be illuminated by each segment 24.

Figure 2F:
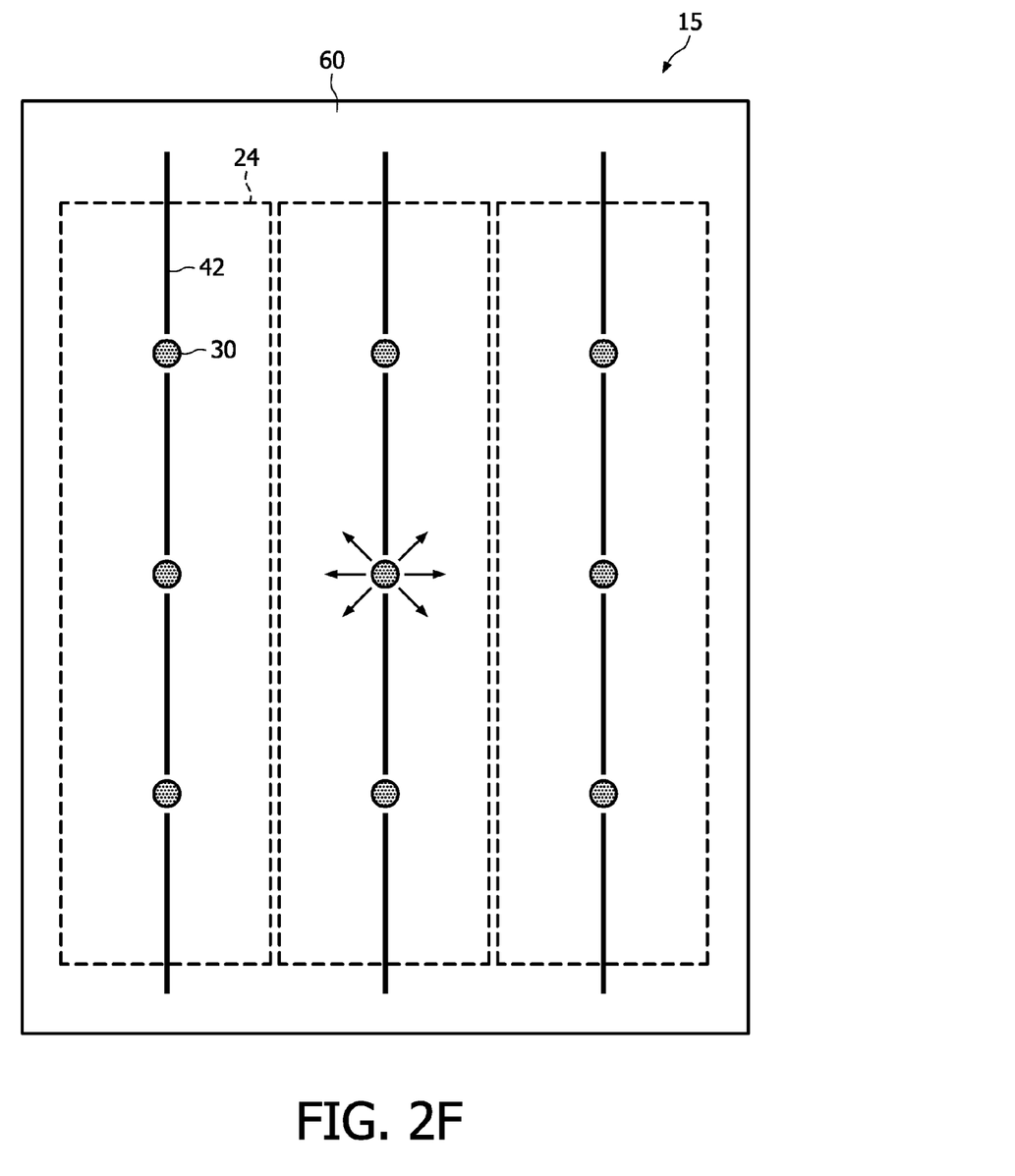

FIG. 2F shows a top view of a sixth embodiment of the backlighting system 15 according to the invention. Also in this sixth embodiment the segments 24 are arranged in strips which, for example, may be sequentially illuminated. However, in this sixth embodiment, the backlighting system 15 comprises a light guide 60 which comprises slits 42 constituting the light barriers 42. The light sources 30 are arranged in openings in the light guide 60, which also form openings in the light barriers 42. The light emitted by the light sources 30 provides an overlap in a direction perpendicular to the light barriers 42. The slits 42 or light barriers 42 may, for example, be filled with a reflective material to influence the reflective and/or translucent characteristics of the light barrier 42. The light guide 60 may, for example, be made of PMMA, and the slits 42 may be formed using a laser cutter. In the embodiment shown in FIG. 2F, the light barriers 42 are arranged in a vertical direction. Alternatively, the light barriers 42 may, of course, also be arranged in a horizontal direction, allowing a plurality of lines of pixels to be illuminated by each segment 24.

Figure 2G:
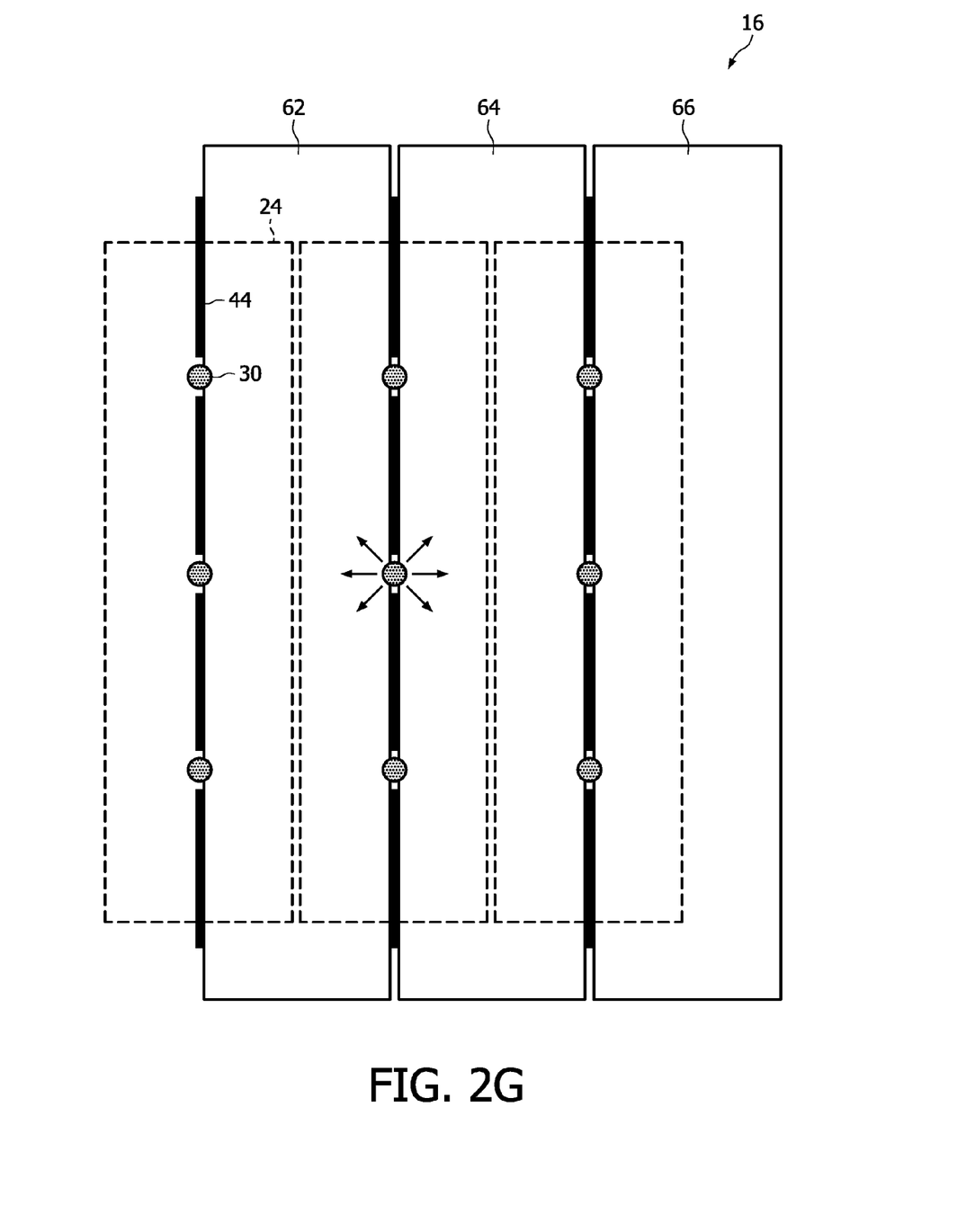

FIG. 2G shows a top view of a seventh embodiment of the backlighting system 16 according to the invention. Also in this seventh embodiment the segments 24 are arranged in strips which, for example, may be sequentially illuminated. However, in this seventh embodiment, the backlighting system 16 comprises a plurality of sub-light guides 62, 64, 66. The edges 44 of the sub-light guides 62, 64, 66 constitute the light barriers 44. The light sources 30 are arranged in openings at the edges of the sub-light guides 62, 64, 66. The light emitted by the light sources 30 provides an overlap in a direction perpendicular to the light barriers 44. The edges 44 or light barriers 44 may, for example, comprise a coating comprising a reflective material to influence the reflective and/or translucent characteristics of the light barrier 44. The sub-light guides 62, 64, 66 may, for example, be made of strips of PMMA. Again, in the embodiment shown in FIG. 2G the light barriers 44 are arranged in a vertical direction. Alternatively, the light barriers 44 may, of course, also be arranged in a horizontal direction, allowing a plurality of lines of pixels to be illuminated by each segment 24.

Figure 3:
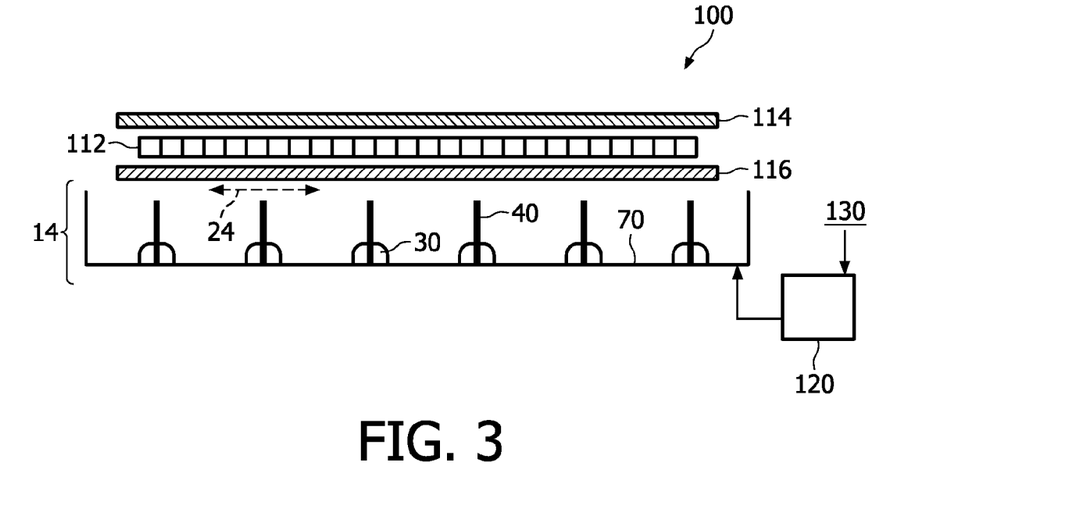
FIG. 3 shows a display device according to the invention.

FIG. 3 shows a cross-sectional view of a display device 100 according to the invention, comprising a backlighting system 14 according to the invention. The backlighting system 14 according to the invention comprises a plurality of light barriers 40 defining a grid, and comprises a plurality of light sources 30 placed on the grid defined by the light barriers 40. The light sources 30 are arranged on a back plate 70 which preferably is a reflective back plate 70. The light sources 30 are arranged to illuminate segments 24 which are indicated in FIG. 3 with a dashed double arrow 24. The display device 100 may, for example, be a liquid crystal display device 100 which comprises a layer of electrically interconnected (not shown) liquid crystal cells 112, a polarizing layer 114, and an analyzing layer 116. Alternatively, the display device 100 may be any other non-emissive display device 110. In an alternative embodiment of the backlighting system 14 (as shown in FIG. 3), the backlighting system 14 may further comprise a controller 120 for receiving feedback information 130 of the light sources 30 for controlling the intensity and/or color of the light emitted by each segment.

Figure 4:
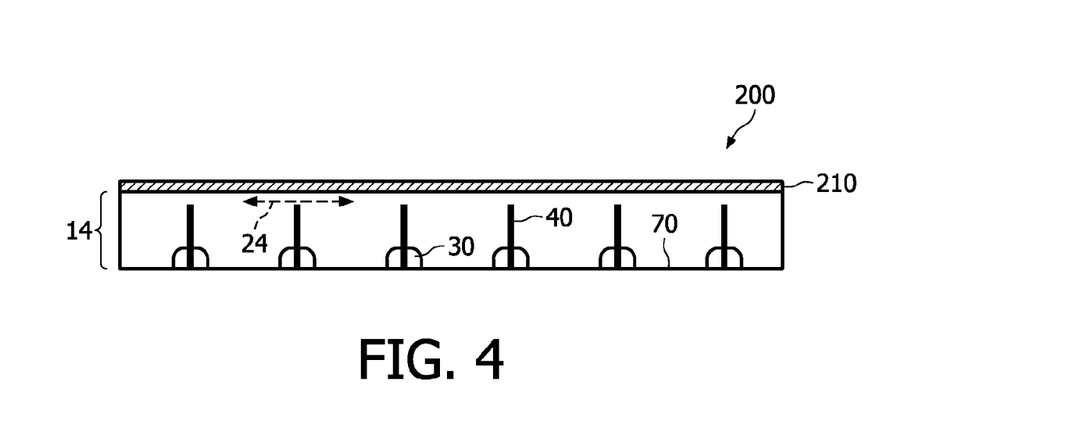
FIG. 4 shows a one- or two-dimensional, dimmable light source comprising the backlighting system according to the invention.

FIG. 4 shows a one- or two-dimensional, dimmable light source 200 comprising the backlighting system 14 according to the invention. Again, the backlighting system 14 comprises a plurality of light barriers 40 defining a grid, and comprises a plurality of light sources 30 placed on the grid defined by the light barriers 40. The light sources 30 are arranged on a back plate 70 which preferably is a reflective back plate 70. The segments 24 which are illuminated by the light sources 30 are again indicated with a dashed double arrow 24. The dimmable light source 200, for example, comprises a diffuser 210 for diffusing the light emitted by the individual segments 24 of the backlighting system 14.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. Backlighting system comprising a plurality of segments with associated light sources for selectively illuminating a predefined area of pixels of a display device, the backlighting system being configured for selectively controlling the intensity and/or color of the light emitted from the segment, each segment comprising a light source, the backlighting system further comprising light barriers not coinciding with edges of the segments, the light barriers being configured for spreading light within the segment and to the direct neighboring segments, the light barriers defining grid-lines of a grid, the light source occupying a position on the grid-line which at least partially coincides with at least one of the light barriers for spreading light on either side of the light barrier, the backlighting system further comprises a controller for receiving feedback information of the light sources for controlling the intensity and/or color of the light emitted by each segment.

2. Backlighting system as claimed in claim 1, wherein the light source is arranged on an intersection between two grid-lines, each of the two grid lines at least partially coinciding with at least one of the light barriers.

3. Backlighting system as claimed in claim 1, wherein the grid comprises a substantially orthogonal grid.

4. Backlighting system as claimed in claim 2, wherein neighboring intersections of the light source are free from further light sources, the neighboring intersections being intersections of the grid on either side of the light source when moving along the grid-lines.

5. Backlighting system as claimed in claim 1, wherein the light barriers at least partially coinciding with the grid-lines are arranged in a triangular arrangement.

6. Backlighting system as claimed in claim 5, wherein the triangular arrangement comprises isosceles triangles.

7. Backlighting system as claimed in claim 1, wherein the backlighting system comprises a light guide comprising the light barriers and the light sources.

8. Backlighting system as claimed in claim 7, wherein the light barriers are slits cut into the light guide.

9. Backlighting system as claimed in claim 8, wherein the slits are at least partially filled with a reflective material.

10. Backlighting system as claimed in claim 7, wherein the light guide comprises a plurality of sub-light guides, the edges of the plurality of sub-light guides being the light barriers.

11. Backlighting system as claimed in claim 10, wherein the edges of the sub-light guides comprise a reflective material.

12. Backlighting system as claimed in claim 10, wherein the sub-light guides are arranged for substantially directly illuminating a light emitting window of the backlighting system.

13. Backlighting system as claimed in claim 1, wherein the light barriers are partially translucent.

14. Backlighting system as claimed in claim 1, wherein the part of the grid-lines not covered by the light barrier is occupied by the positions of the light sources.

15. Backlighting system as claimed in claim 1, wherein the light source in each segment is substantially arranged in the center of the segment.

16. Display device comprising the backlighting system as claimed in claim 1.

* * * * *